(12) United States Patent
Choi et al.

(10) Patent No.: US 7,590,112 B2
(45) Date of Patent: Sep. 15, 2009

(54) PACKET FORWARDING APPARATUS OF HIGH SPEED ROUTING SYSTEM AND ROUTING LOOKUP METHOD USING THE SAME

(75) Inventors: Woo-Young Choi, Daejon (KR);
Byungjun Ahn, Daejon (KR);
Young-Sun Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 864 days.

(21) Appl. No.: 10/882,605

(22) Filed: Jun. 30, 2004

(65) Prior Publication Data

US 2005/0141517 A1 Jun. 30, 2005

(30) Foreign Application Priority Data

Dec. 27, 2003 (KR) .................... 10-2003-0098388

(51) Int. Cl.
*H04L 12/28* (2006.01)
(52) U.S. Cl. ...................... 370/389; 370/401
(58) Field of Classification Search ................ None
See application file for complete search history.

(56) References Cited

U.S. PATENT DOCUMENTS

| | | | |
|---|---|---|---|
| 6,665,297 B1 * | 12/2003 | Hariguchi et al. | 370/392 |
| 6,917,618 B2 * | 7/2005 | Thubert et al. | 370/395.31 |
| 2004/0258061 A1 * | 12/2004 | Sahni et al. | 370/389 |

FOREIGN PATENT DOCUMENTS

| | | |
|---|---|---|
| JP | 2002-174805 | 6/2000 |
| KR | 1020020077686 A | 10/2002 |
| KR | 1020030018269 | 3/2003 |

OTHER PUBLICATIONS

"Improving the Performance of the Forwarding Engine in the High-speed Router using Vitesse IQ2x00 Network Processor", 2002 Autumn Workshop and General Mtg of Inst of Korea, vol. 25, No. 2, Nov. 30, 2002, pp. 629-633.
"Routing Lookups in Hardware at Memory Access Speeds" 1998 IEEE, pp. 1240-1247.

* cited by examiner

*Primary Examiner*—Jayanti K Patel
*Assistant Examiner*—Dargaye H Churnet
(74) *Attorney, Agent, or Firm*—Blakely, Sokoloff, Taylor & Zafman

(57) ABSTRACT

There is provided a packet forwarding processing apparatus of a high speed routing system and a routing lookup method using the same. The packet forwarding processing apparatus includes: a routing table storage unit; a routing table management unit; and a routing table lookup unit. The routing table storage unit is used for storing routing table entries which are built based on a collected routing information. The routing table management unit is used for modifying, creating, and deleting the table entries of the routing table storage unit. The routing table lookup unit is used for looking up destination route information from the routing tables stored in routing table storage unit, in which the destination route information is associated with destination address extracted from an input data packet.

12 Claims, 10 Drawing Sheets

[Table Lookup key]

FIG. 6A

| Prefix | | | | | | | | Length | Destination Route Value | |
|---|---|---|---|---|---|---|---|---|---|---|
| 1011 | 0000 | 1111 | 1111 | 0011 | XXXX | XXXX | XXXX | /20 | A_l | ← 610 |
| 1011 | 0000 | 1111 | 1111 | 0011 | 1110 | 1111 | 111X | /31 | B_l | ← 620 |
| 1111 | 1111 | 1111 | 1111 | 1XXX | XXXX | XXXX | XXXX | /17 | C_l | ← 630 |

| Pkey_field | Skey_field | Tkey_field |
|---|---|---|
| 18bits | 6bits | 8bits |

PACKET FORWARDING APPARATUS OF HIGH SPEED ROUTING SYSTEM AND ROUTING LOOKUP METHOD USING THE SAME

FIELD OF THE INVENTION

The present invention relates to a packet forwarding apparatus of a high speed routing system and a routing lookup method using the same, in which a routing table having a prefix information and a destination route information is built and a destination route is found from the routing table in a data packet input.

DESCRIPTION OF RELATED ART

With the rapid advance of Internet, a backbone network demands a gigabit to terabit communication rate. In order to enhance a router performance in the backbone network, approaches to an increase of a physical link speed, an improvement of a packet switching capability and a packet forwarding speed improvement are required. Among them, the link speed and the packet switching capability have been greatly progressed owing to a rapid development of optical communication and a switching interface standardization. On the other hand, the packet forwarding, whose performance is largely dependent on an operation method of an algorithm and a routing table memory, has made relatively less progress. Therefore, the packet forwarding is an important factor that determines the router performance in the backbone network.

Generally, a destination route lookup is achieved through a longest prefix matching.

In order to reduce memory blocks, route lookup algorithms using the longest prefix matching construct a routing table structure for looking up the longest prefix using a prefix structure. In such algorithms, there are a lot of affairs to be processed in software during a table lookup and a lookup table must be realigned, reconfigured and recompressed in order for a table update, such as modification, addition and deletion of a lookup information. Therefore, it takes much time to update the lookup table.

Also, such a conventional method has problems in that packet process is delayed or process capability is degraded while the lookup table is reconfigured.

SUMMARY OF THE INVENTION

It is, therefore, an object of the present invention to provide a packet forwarding processing apparatus of a high speed routing system and a routing lookup method using the same, which uses a longest prefix matching for a destination route lookup, uses a table lookup key for a routing table management and lookup, and performs a lookup function using three routing tables using an indexing information of entries according to the table lookup key.

It is another object of the present invention to provide a packet forwarding processing apparatus of a high speed routing system, including: a routing table storage unit for storing routing table entries, which are built based on a collected routing information; a routing table management unit for modifying, creating and deleting the table entries of the routing table storage unit; and a routing table lookup unit for looking up destination route information from the routing tables stored in routing table storage unit, the destination route information being associated with destination address extracted from an input data packet.

In another aspect of the present invention, there is provided a routing lookup method of a high speed routing system, including the steps of: a) extracting destination address from an inputted data packet at a routing table lookup block; b) mapping the extracted destination address on a table lookup key; c) reading out contents of each field through a memory access to a primary table entry having same address as "Pkey_field" value, which is a first field of the mapped table lookup key; d) checking whether a valid field value of the read primary table entry is a predetermined value; e) if the valid field value is not the predetermined value at the step d), inputting a default route to a destination route information value; f) if the valid field value is the predetermined value, checking whether a shift count field value is a predetermined value; g) if the shift count field value is not the predetermined value at the step f), checking whether the shift count field value is another predetermined value, and if not, inputting a default route to a destination route information value, and if the shift count field value is the predetermined value or the another predetermined value, reading out field contents of a secondary table entry through an access to the secondary table entry; h) checking whether a valid field value of the read secondary table entry is a predetermined value; i) if the valid field value is not the predetermined value at the step h), inputting a default route to a destination route information; j) if the valid field value is a predetermined value, checking whether a shift count field value is a predetermined value; k) if the shift count value is not the predetermined value at the step j), checking whether the shift count value is another predetermined value, and if not, inputting a default route to a destination route information value, and if the shift count field value is the predetermined value, inputting "information field value of a secondary table entry" to a destination route information, and if the shift count field value is the another predetermined value, reading out field contents of a third table entry through an access to the third table entry; and l) if a valid field value of the read third table entry field is a predetermined value, inputting "information field value of a third table entry" to a destination route information, and if the valid field value of the read third table entry field is not the predetermined value, inputting a default route to a destination route information.

BRIEF DESCRIPTION OF THE DRAWINGS

The above and other objects and features of the instant invention will become apparent from the following description of preferred embodiments taken in conjunction with the accompanying drawings, in which:

FIGS. 6A to 6D illustrate a prefix and a destination route information value for registering the table of the packet forwarding apparatus in accordance with the present invention;

DETAILED DESCRIPTION OF THE INVENTION

Figure 1:
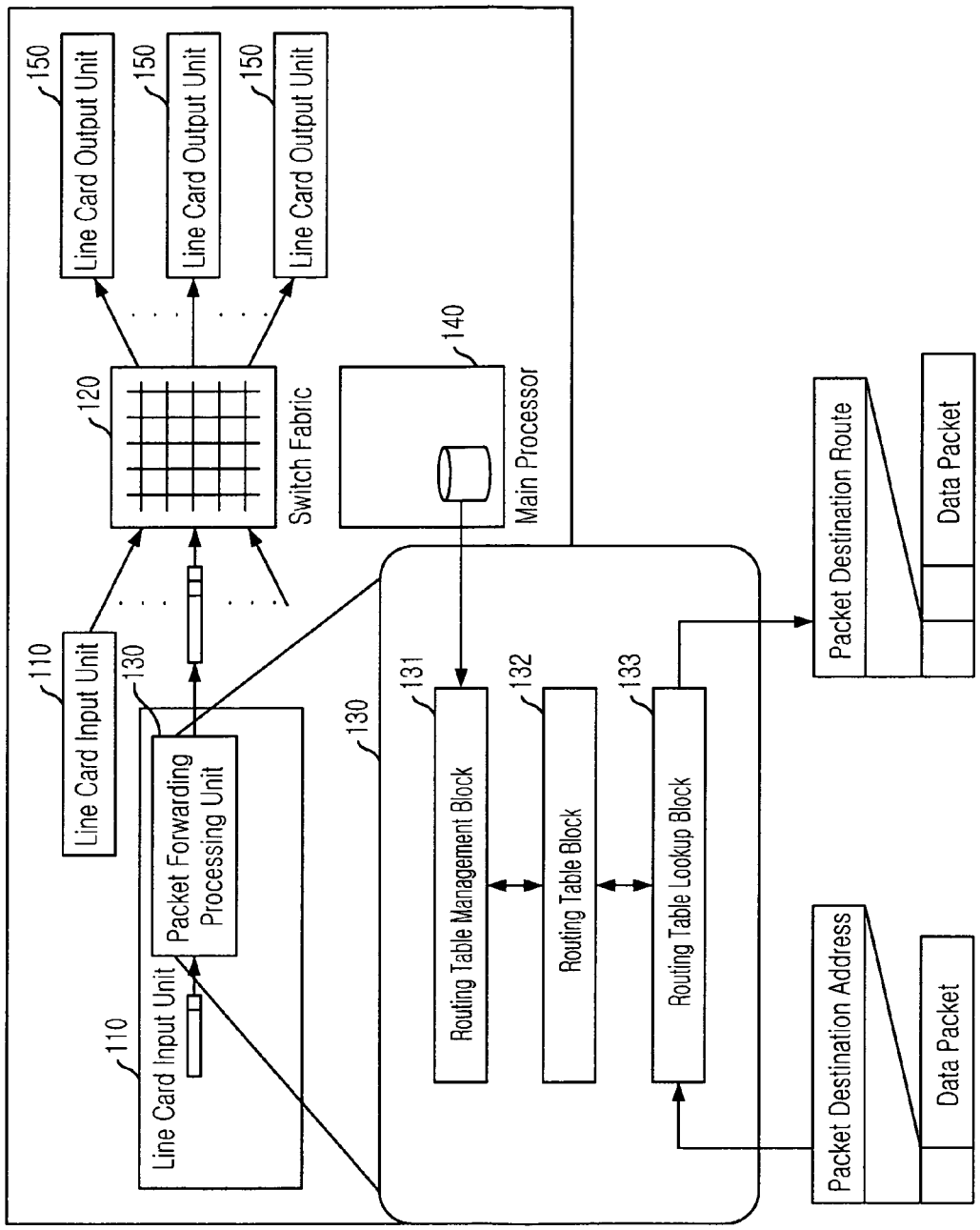
FIG. 1 is a schematic diagram illustrating a packet forwarding apparatus of a high-speed routing system in accordance with an embodiment of the present invention.

The above and other objects and features of the present invention will become apparent from the following description of the preferred embodiments given in conjunction with the accompanying drawings, in which:

FIG. 1 is a schematic diagram illustrating a packet forwarding apparatus of a high speed routing system in accordance with an embodiment of the present invention.

A router and a routing method applicable in the present invention will now be described.

In high speed backbone routers, which are now developed and available in the markets, a packet forwarding processing unit 130 for processing incoming data packets at high speed is not disposed at a main processor 140 but at each line card input unit 110.

Packets that are inputted from the line card input unit 110 are transported through the packet forwarding processing unit 130 to a switch fabric 120. The transported packets are transmitted through an output terminal of the switch fabric 120 to a corresponding line card output unit 150 according to destination routes.

The packet forwarding processing unit 130 in accordance with the present invention includes a routing table management block 131, a routing table block 132, and a routing table lookup block 133.

The routing table block 132 stores routing table entries, which are built based on collected routing information, and the routing table management block 131 modifies, creates and deletes the table entries of the routing table block 132. The routing table lookup block 133 retrieves destination route information from the routing table stored in the routing table block 132. Here, the destination route information relates to destination address extracted from an input data packet.

The routing table lookup block 133 selects the most approximate entry among the entries stored in the routing table block 132 using the longest prefix matching, based on a packet destination address of an incoming data packet. Then, the routing table lookup block 133 extracts the packet destination route stored in the routing table block 132 and performs a process of mapping the extracted packet destination route on the input data packet.

The routing table management block 131 receives the prefix, the destination route information, and control information on modification, creation and deletion of the table from the main processor block 140 and manages the routing table block 132.

Figure 2:
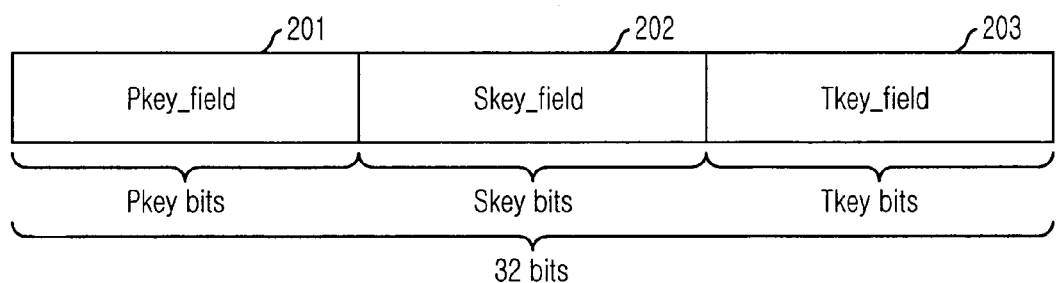
FIG. 2 illustrates a table lookup key of the packet forwarding apparatus in accordance with an embodiment of the present invention.

A table lookup key shown in FIG. 2 is required in order to manage the routing table entry modification, creation and deletion according to the prefix value and look up the destination route within the routing table entries based on the destination address in the inputted packet.

FIG. 2 illustrates a table lookup key of the packet forwarding processing unit in accordance with an embodiment of the present invention.

The table lookup key includes a prefix which is a routing information of the routing table management block 131 and provided with a "Pkey_field" 201 occupying "Pkey" bits, a "Skey_field" 202 occupying "Skey" bits, and a "Tkey_field" 203 occupying "Tkey" bits. A total size of the table lookup key is 32 bits.

Figure 3:
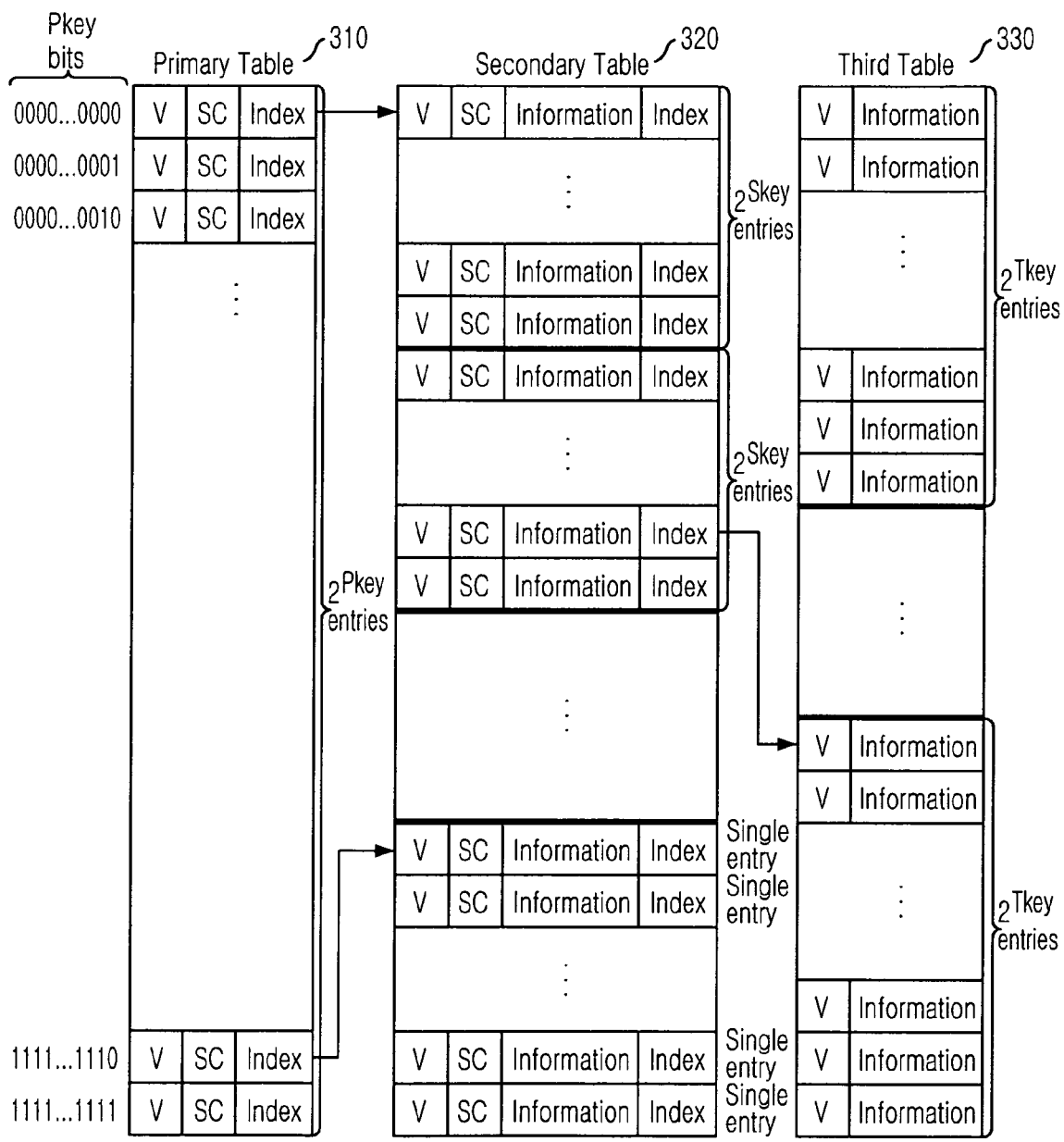
FIG. 3 illustrates a routing table block of the packet forwarding apparatus in accordance with an embodiment of the present invention.

FIG. 3 illustrates a routing table block of the packet forwarding processing unit in accordance with an embodiment of the present invention.

Referring to FIG. 3, the routing table block 132 is a table including a prefix information, a packet destination route information mapped with the prefix information, and entries having control bits as fields. The routing table block 132 is configured with three tables, that is, a primary table 310, a secondary table 320 and a third table 330.

The primary table 310 includes a total of $2^{Pkey}$ entries and the number of address bits for distinguishing each entry is identical to the "Pkey" bits, which is the first field of the table lookup key.

The secondary table 320 includes independent single entries and a plurality of blocks configured with $2^{Skey}$ entries having fixed values.

The third table 330 includes a plurality of blocks configured with $2^{Tkey}$ entries having fixed values.

Figure 4:
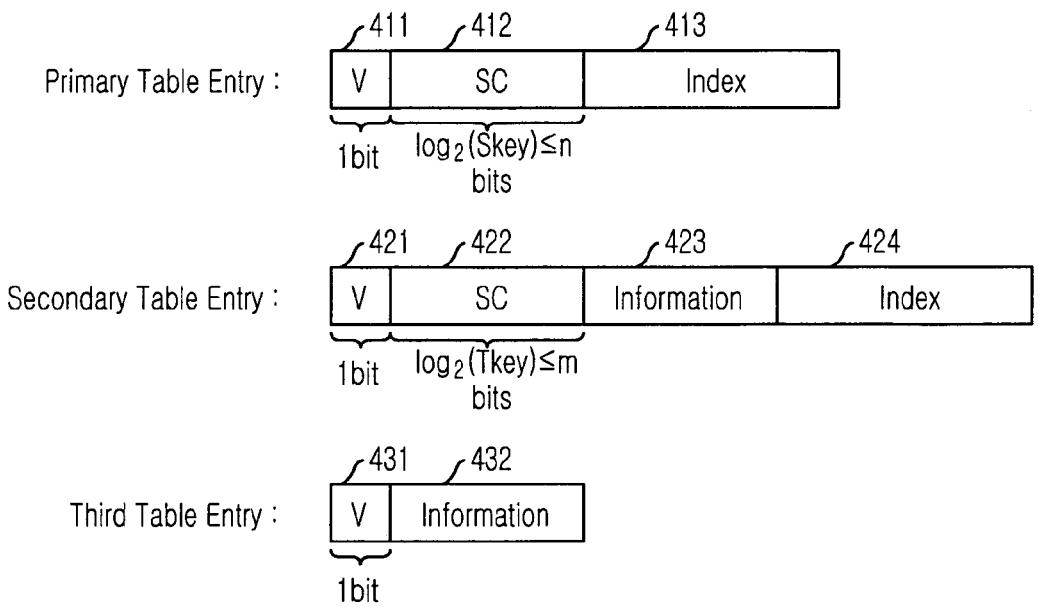
FIG. 4 illustrates field values of the table entries of FIG. 3.

FIG. 4 illustrates field values of the entries in the tables of FIG. 3.

The entry for the primary table 310 includes a valid field 411, a shift count field 412, an index field 413.

The valid field 411 is a bit that notifies whether a current entry is an entry having a useful information. The entry having the useful information is set to "0b1".

A value of the shift count field 412 has relation to the number of entries constituting one block in the secondary table 320. Also, the number of bits occupied by the shift count value is an integer greater than or equal to "$\log_2(\text{Skey})$". For example, if the shift count value is "6", it means that blocks constituted with "$2^6(=64)$ entries are present within the secondary table 120, which is associated with the current entry. If the shift count value is "0", it means that the entry is present not as a block unit but as one entry (single entry) in the secondary table 320 associated with the current entry. At this time, the minimum number of bits occupied by the shift count field are three bits ($\log_2 6 < 3$).

In order for efficiency of the table management, the number of bits occupied by the shift count field is equal at all entries constituting the primary table 310.

The index field 413 stores an information on a base address value at which the secondary table 320 associated with the current entry is located.

The entry constituting the secondary table 320 includes a valid field 421, a shift count field 422, an information field 423, and an index field 424.

Like the primary table entry field 411 and the third table entry field 431, the valid field 421 is a bit that notifies whether a current entry is an entry having a useful information. The entry having the useful information is set to "0b1".

A value of the shift count field 422 has relation to the number of entries constituting one block in the third table 330. Also, the number of bits occupied by the shift count value is an integer greater than or equal to "$\log_2(\text{Tkey})$". For example, if the shift count value is "8", it means that blocks constituted with "$2^8(=256)$ entries are present within the third table 330, which is associated with the current entry. If the shift count value is "0", it means that the destination route information value, which is the lookup information, is stored in the information field of the current entry. At this time, the minimum number of bits occupied by the shift count field are three bits ($\log_2 8 \leq 3$).

In order for efficiency of the table management, the number of bits occupied by the shift count field 422 are equal at all entries constituting the secondary table 320.

The information field 423 stores a destination route information value associated with the current entry.

The index field 423 stores an information on a base address value at which the third table 330 associated with the current entry is located.

The entry constituting the third table 330 includes a valid field 431 and an information field 432.

The valid field 431 is a bit that notifies whether a current entry is an entry having a useful information. The entry having the useful information is set to "0b1".

The information field 432 stores a destination route information value associated with the current entry.

Figure 5:
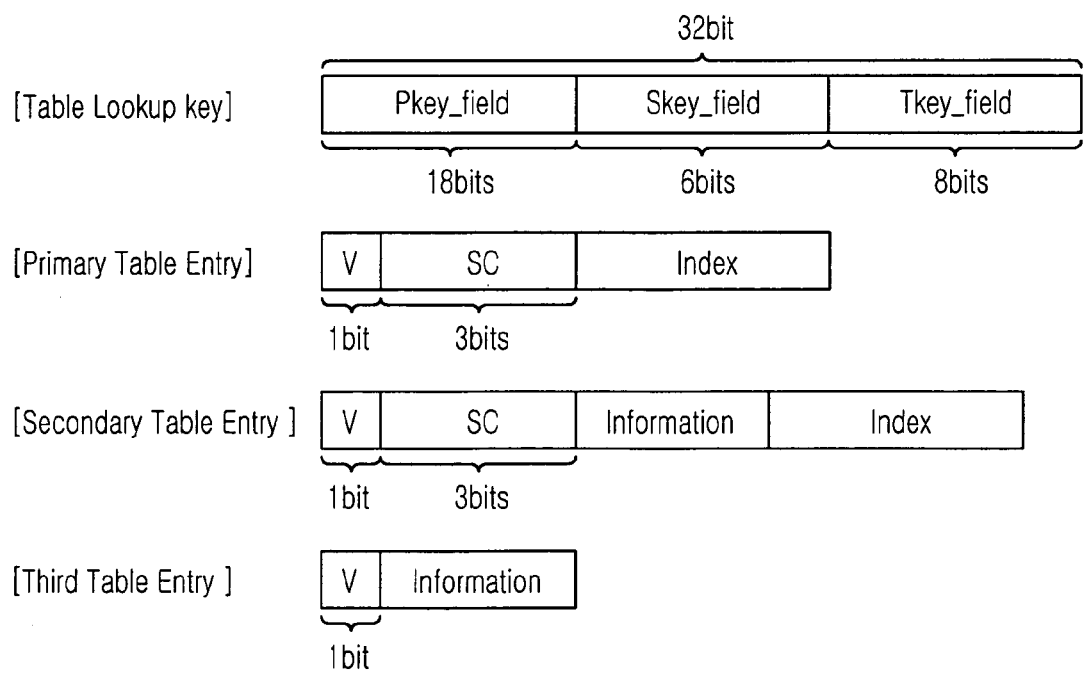
FIG. 5 illustrates a table lookup key and a field size of a table entry in the packet forwarding apparatus.

FIG. 5 illustrates a table lookup key and a field size of a table entry in the packet forwarding processing unit in accordance with an embodiment of the present invention.

Referring to FIG. 5, sizes of the fields constituting the table lookup keys 201 to 203 are "Pkey=18 bits", "Skey=6 bits" and "Tkey=8 bits".

At this point, the shift count bit of each entry is 3 bits, and sizes of the information field and the index field are properly selected depending on a size of stored information and a size of memory.

FIGS. 6A to 6D illustrate the prefix and destination route information values for registration in the table of the packet forwarding processing unit in accordance with an embodiment of the present invention.

With relation to the above-mentioned routing table block 132, a routing table management process of modifying, registering and deleting the arbitrary prefix and the destination route mapped thereon in the routing table entry will now be described.

For the convenience of explanation, it is assumed that sizes of the fields constituting the table lookup keys 201 to 203 are "Pkey=18 bits", "Skey=6 bits" and "Tkey=8 bits". At this point, the shift count bit of each entry is 3 bits, and sizes of the information field and the index field are properly selected depending on a size of stored information and a size of memory.

A process of registering a prefix 610 having a destination route value of "A_I" in the table entry will be described with reference to FIG. 6A.

Since a length of the prefix 610 is 20 bits, it means that a valid information is upper 20 bits "0b10110000_11111111_0011" among a total of 32 bits. This can be distinguished by 18 bits/2 bits. This means that the field necessary in the table lookup key is "Pkey_field" and "Skey_field".

If the upper 18-bit prefix value is mapped on a first field of the table lookup key, the result is "Pkey_field=0b10110000_11111111_00". If the remaining 2-bit prefix value is mapped on the second field of the table lookup key, the result is "Skey_field=0b11xxxx". "Pkey_field" is used as an address of the primary table entry value. The primary table entry of the corresponding address is found to set the valid field to "0b1". Since the prefix 610 has 2-bit valid information other than 18 bits, the blocks must be configured in the secondary table in order to distinguish them. Therefore, the shift count field of the entry is set to "6" and a base address ("a") of an unused block within the secondary table is registered in the index field.

Figure 6B:
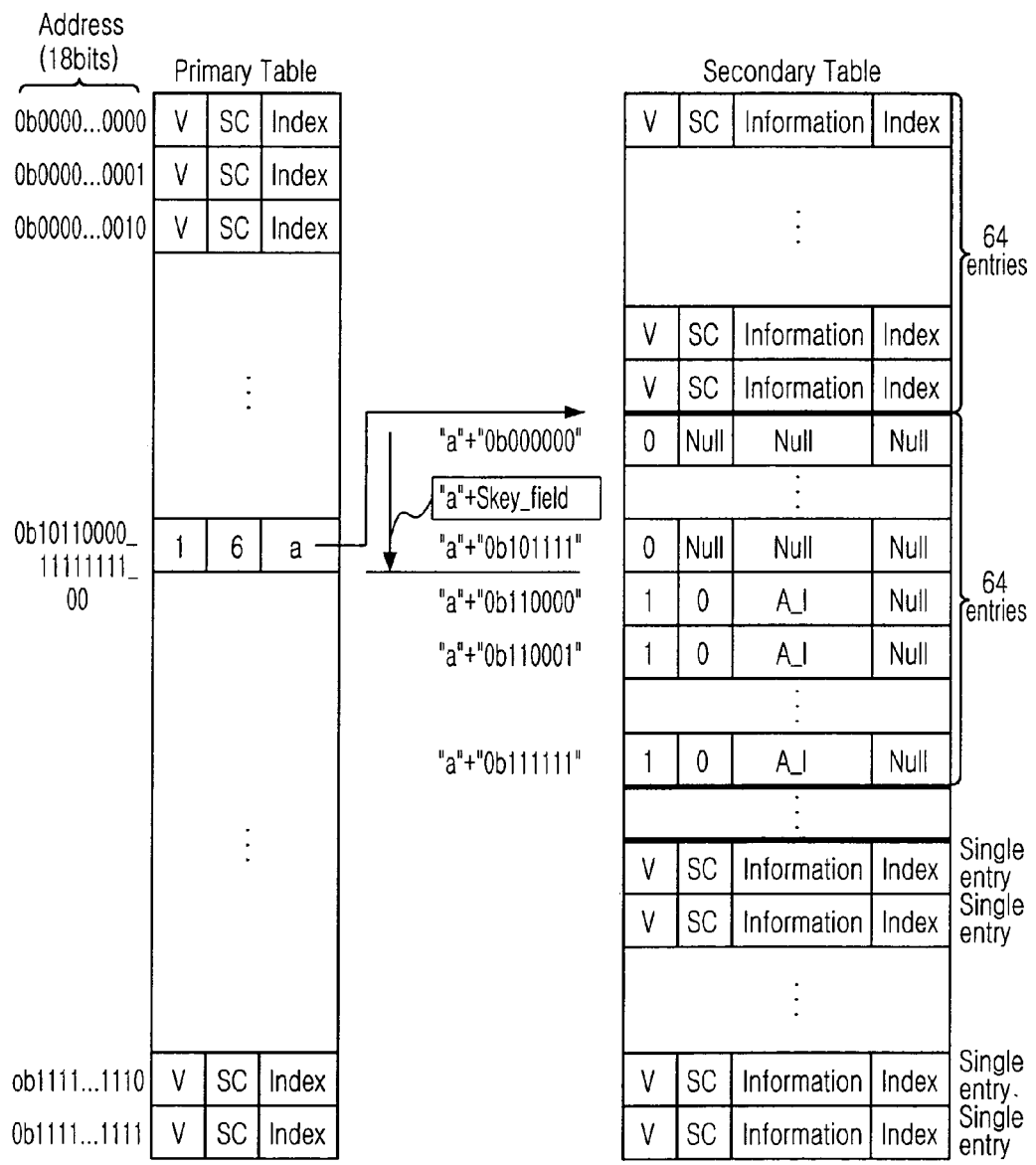

At the secondary table, blocks are constituted with 64 sequential entries, starting from the entry having an address of "a". "Skey_field" of the table lookup key is used to store the destination route information in a valid entry associated with the actual prefix 610 within the built block. In other words, the valid fields of the entries having entry addresses of "a"+"0b110000", "a"+"0b11001", ..., "a"+"0b111111" are set to "0b1", the destination route value of "A_I" is stored in the information filed, and the shift count field is set to "0". In this case, since the index field need not be connected with the third table, it is a null, which is a meaningless value". In this manner, the table registration of the prefix "610" is finished. The corresponding routing table state is shown in FIG. 6B.

Next, a process of registering a prefix 620 having a destination route value of "B_I" in the table entry will be described.

Since a length of the prefix 620 is 31 bits, it means that a valid information is upper 31 bits "0b10110000_11111111_00111110_11111111" among a total of 32 bits. This can be distinguished by 18 bits/6 bits/7 bits. This means that the field necessary in the table lookup key is "Pkey_field", "Skey_field" and "Tkey_field" and the table must be created up to the third table. If the upper 18-bit prefix value is mapped on a first field of the table lookup key, the result is "Pkey_field=0b10110000_11111111_00". Then, if the 6-bit prefix value is mapped on the second field of the table lookup key, the result is "Skey_field=0b111110". If the last 7-bit prefix value is mapped on the "Tkey_field", the result is "Tkey_field=0b111111x".

Using "Pkey_field" as an address of the primary table entry value, if the primary table entry of the corresponding address is found, it has the same as "Pkey_field" value of the prefix 610. Therefore, it can be checked that the valid field is set to "0b1". In this case, the index field information ("a") of the primary table is read out and moved to the secondary table entry of an address "a"+"0b111110".

At the fields of the secondary table entry, since the valid field is "0b1" and the shift count field is "0", a valid destination route is registered in the information field and "null" is stored in the index field. Accordingly, values of this information need to be modified in order to build the third table entry block. "8" is set in the shift count field of the current "a"+"0b111110" entry, thus indicating a connection with the third table block. A base address ("b") of the connected third table entry block is registered in the index field. At this time, "A_I" instead of "null" is registered in the information field. In case where the prefix associated with the destination route stored in the third table that is subject to the current entry is deleted, the current stored value is the valid destination route information. Therefore, it remains without modification.

Figure 6C:
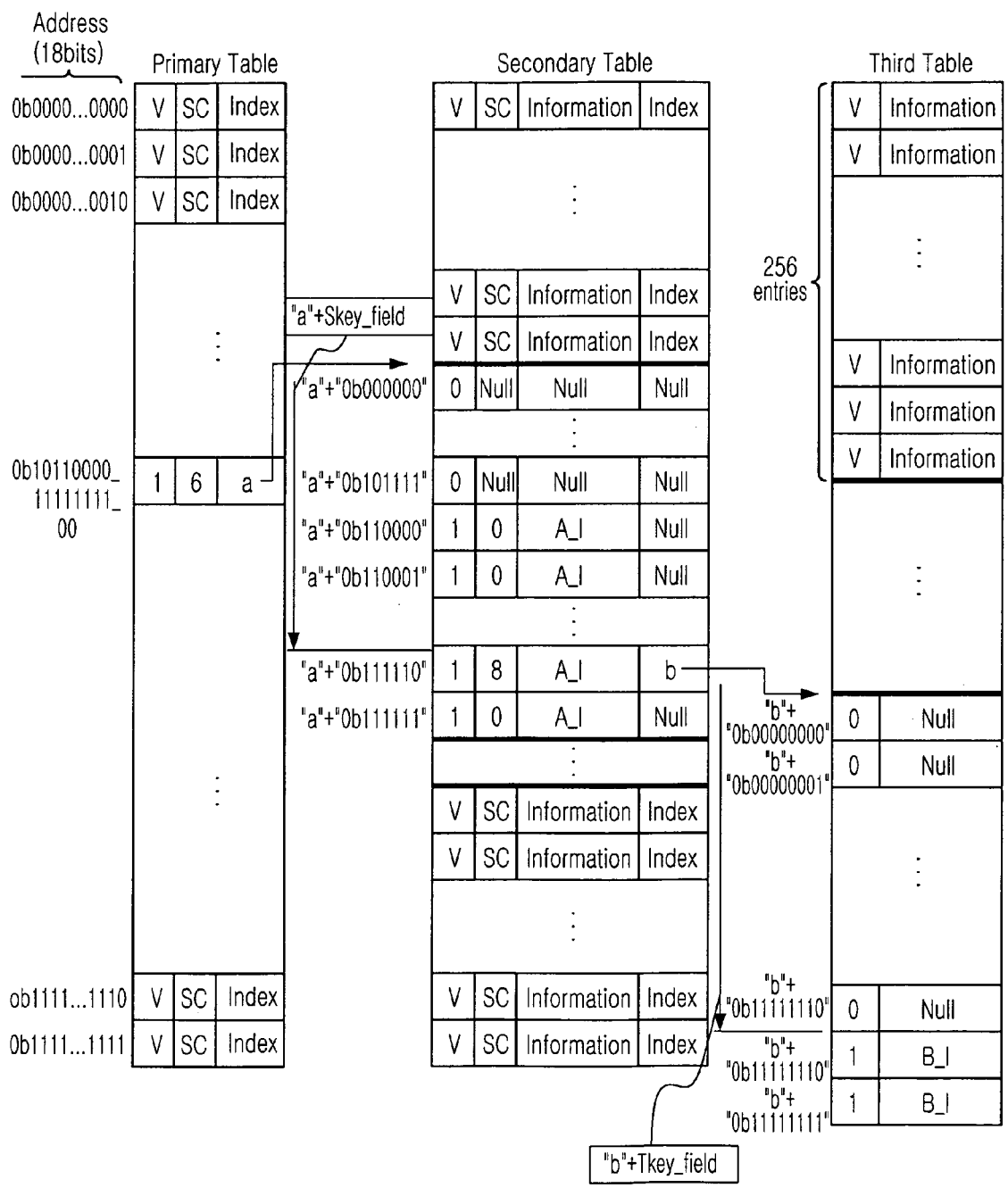

At the third table, blocks are constituted with 256 sequential entries, starting from the entry having an address of "b". "Tkey_field" of the table lookup key is used to store the destination route information in a valid entry associated with the actual prefix 620 within the built block. At this point, since the last bit of the "Tkey_field" is "don't care" value, the entry address to be mapped is "b"+"0b11111110" and "b"+"0b11111111". The valid fields of these entries are set to "0b1", and the destination route value of "B_I" is stored in the information filed. In this manner, the table registration of the prefix "620" is finished. The corresponding routing table state is shown in FIG. 6C.

Last, a process of registering a prefix 630 having a destination route value of "C_I" in the table entry will be described.

Since a length of the prefix 630 is 17 bits, it means that a valid information is upper 17 bits "0b11111111_111111111_1" among a total of 32 bits. This means that the field necessary in the table lookup key is "Pkey_field" and is connected to the single entry of the secondary table.

If the upper 17-bit prefix value is mapped on a 18-bit first field of the table lookup key, the result is "Pkey_field=0b_11111111_1x". In this case, since the last bit is "don't care" value, the primary entries to be mapped are entries having address values of "0b11111111_11111111_10" and "0b11111111_11111111_11".

The valid field of the corresponding entry is set to "0b1". Since the it is connected to the single entry of the secondary table, the shift count field is set to "0", and the address value ("c") of the secondary table entry to be connected is stored in the index field.

Figure 6D:
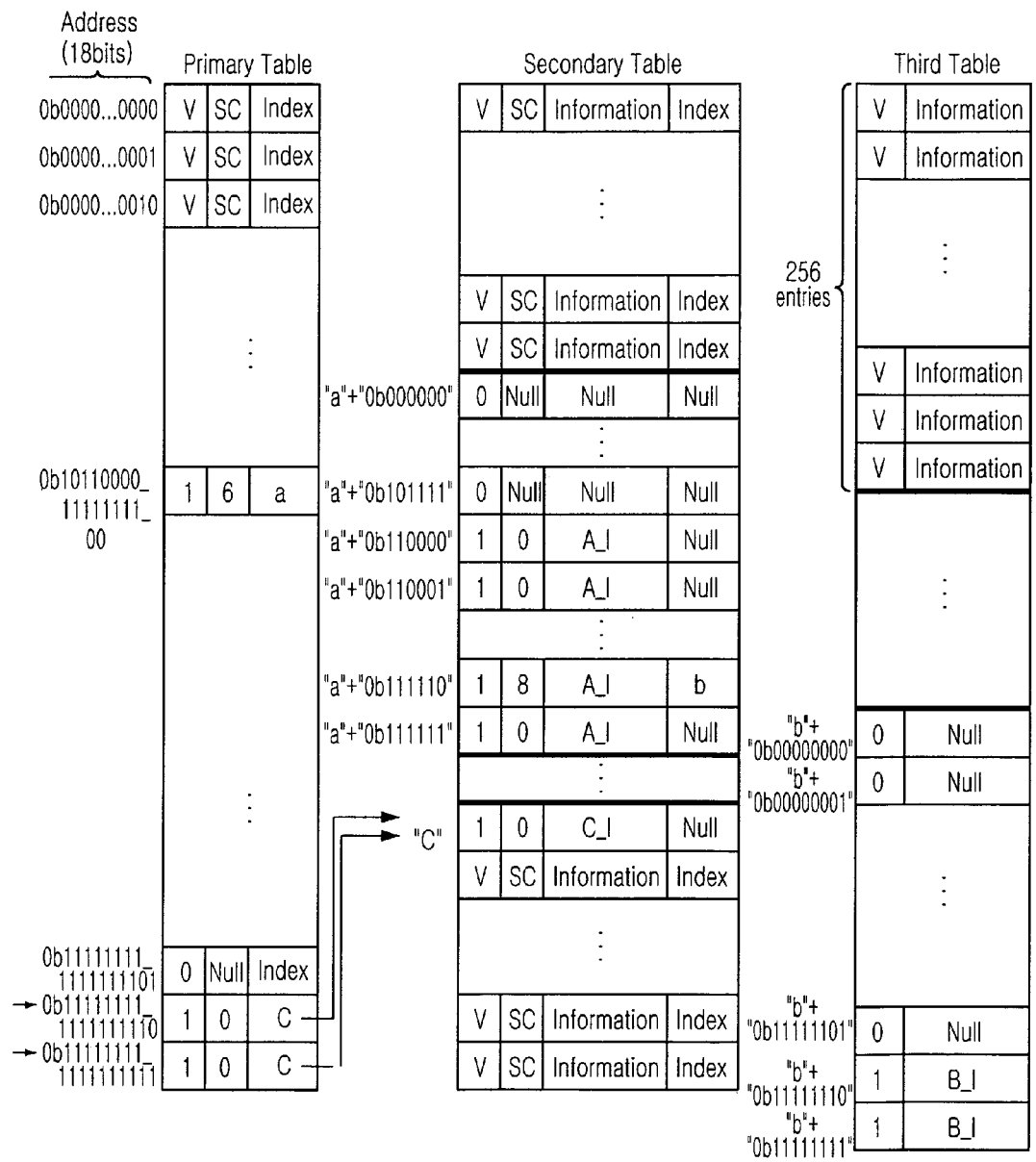

The valid field of the entry having "c" as the address value of the secondary table is set to "0b1" and the shift count field is set to "0". The destination route value "C_I" is stored in the information field. In this manner, the table registration of the prefix "630" is finished. The corresponding routing table state is shown in FIG. 6D.

The modification and deletion of the entries are carried out in a reverse order.

Figure 7:
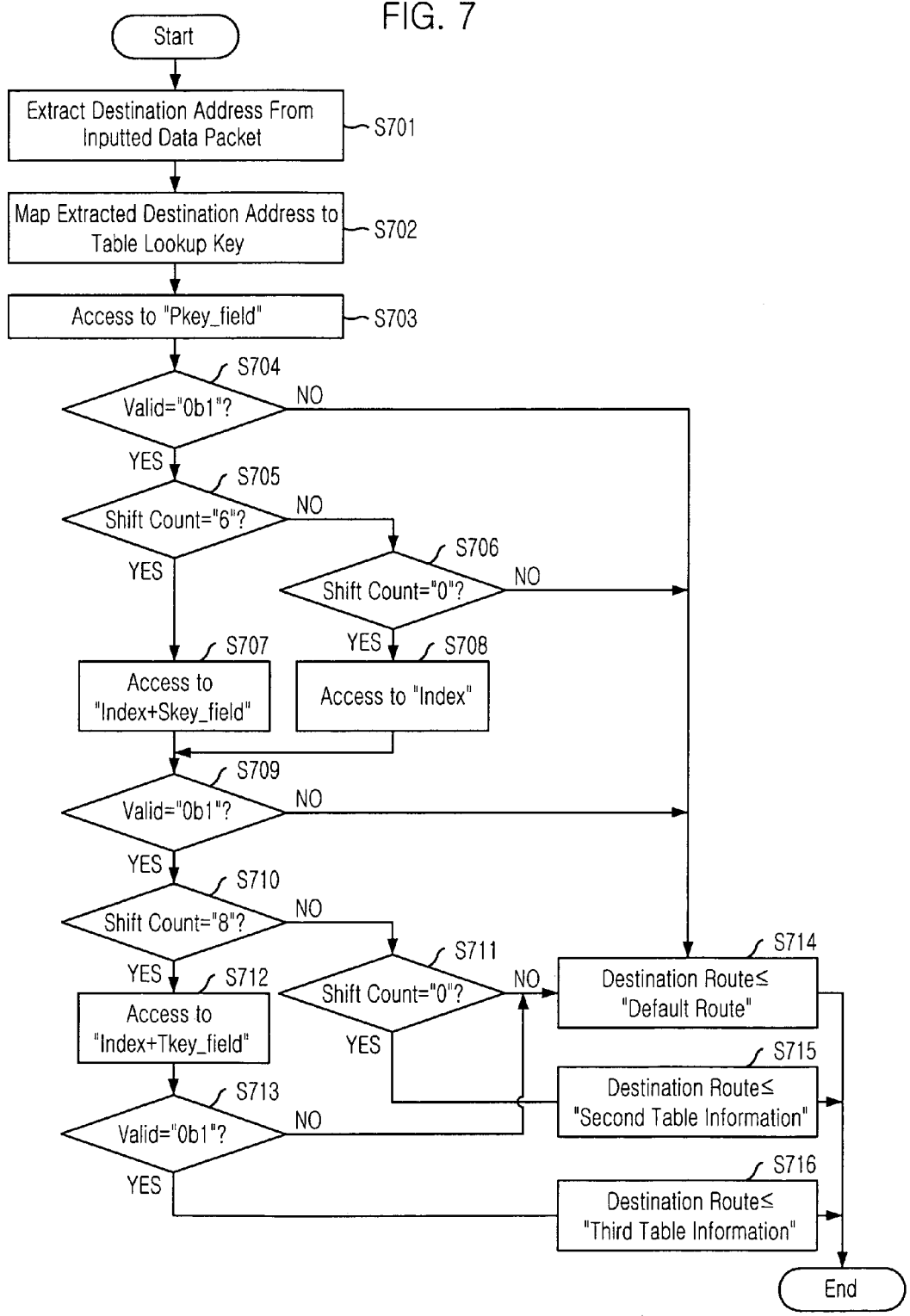
FIG. 7 is a flowchart illustrating a routing lookup method in accordance with an embodiment of the present invention.

With regard to the routing table, a routing lookup algorithm of finding the destination route information stored the entry information field by looking up the routing table in arbitrary data packet input is shown in FIG. 7. The routing lookup algorithm will be described below.

FIG. 7 is a flowchart illustrating a routing lookup method in accordance with an embodiment of the present invention.

According to the routing lookup algorithm, the destination address of the data packet is inputted and the routing table is retrieved based on the destination address. A destination route information to which the data packet as the final output information is sent is found.

In step S701, the routing table lookup block 133 of the packet forwarding process unit 130 in the line card input unit 110 extracts the destination address from the inputted data packet. Generally, in case of IPv4, the destination address is 32-bit destination IP address. In step S702, like the prefix registration, the extracted 32-bit destination address is mapped on the table lookup key.

In step S703, contents of each memory are read out through the memory access to the primary table entry having the same address as the first field "Pkey_field" of the mapped table lookup key.

In step S704, it is checked whether the valid field of the previously read primary table entry is "0b1" or not.

In step S714, if the valid field is not "0b1", a default route is inputted to the destination route information and the routine is ended.

In step S705, if the valid field is "0b1", it is checked whether the shift count field is "6" or not.

In step S706, if the shift count field is not "6", it is checked whether it is "0" or not. If not, the process proceeds to the step S714. This is, a default route is inputted to the destination route information value and the routing lookup algorithm routine is ended.

In step S707, if the shift count field is "6" or "0", contents of the secondary table entry are read out through the access to the secondary table entry. If the shift count field is "6", field contents of the entry having the memory address of "primary table entry index field value+Skey_field value" are read out through the memory access. In step S708, if the shift count field is "0", field contents of the entry having the memory address of "primary table entry index field value" are read out through the memory access.

In step S709, it is checked whether the valid field of the secondary table entry is "0b1" or not.

If the valid field is not "0b1", a default route is inputted to the destination route information and the routine is ended.

In step S710, if the valid field is "0b1", it is checked whether the shift count field is "8" or not.

In step S711, if the shift count field is not "8", it is checked whether it is "0" or not. If not, a default route is inputted to the destination route information value and the routine is ended.

In step S715, if the shift count field is "0", "information field value of the secondary table entry" is inputted and the routine is ended.

In step S712, if the shift count field is "8", field contents of the third table entry are read out through the access to the third table entry. At this point, in step S712, the memory address of the third table entry is "secondary table entry index field+ Tkey_field".

In step S713, whether the valid field value is "0b1" or not is checked at the read third table entry fields. In step S716, if the valid field is "0b1", "the information field value of the third table" is inputted to the destination route information value and the routine is ended.

Figure 8:
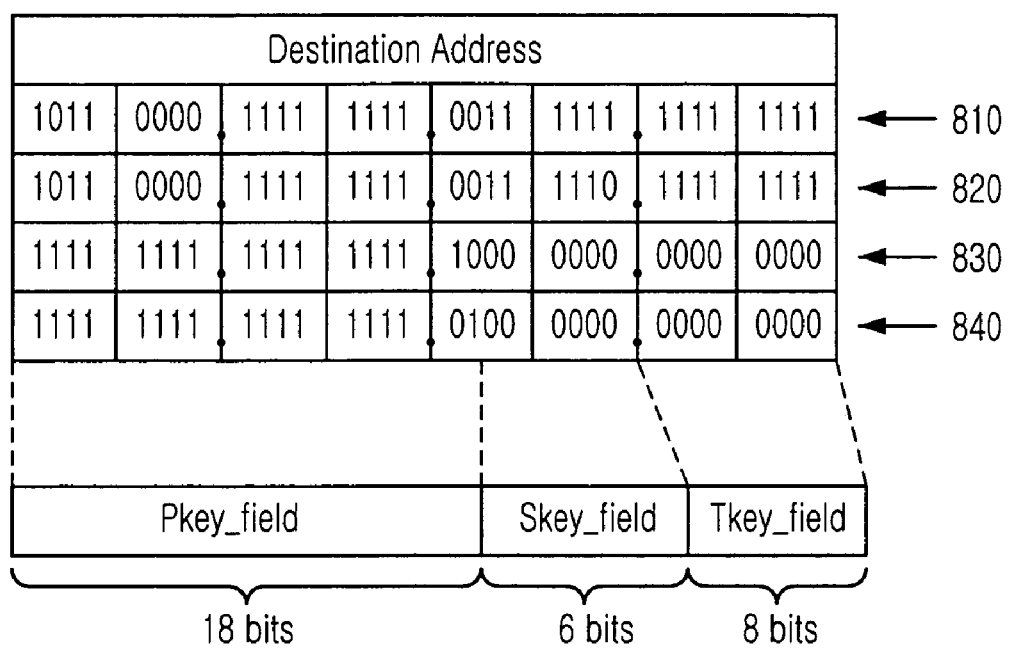
FIG. 8 illustrates a destination address of data packet inputted in the routing lookup method in accordance with the present invention.

Another embodiment of the routing lookup method will be described on the assumption that the destination route information is stored in the routing table like FIG. 6D and the destination address of the incoming data packet is given like FIG. 8. FIG. 8 illustrates the destination address of the incoming data packet in the routing lookup method in accordance with the present invention.

First, a case of the destination address 810 of the inputted data packet will be described below.

In case where the destination address is "0b10110000_ 11111111_00111111_11111111", if the destination address is mapped on the table lookup key field (step S702), the result is "Pkey_field=0b10110000_11111111_00", "Skey_field=0b111111" and "Tkey_field=0b11111111".

If the field information of the primary table entry is read out through "Pkey_field" (step S703), the valid field is "0b1" (step S704) and the shift count field is "6" (step S705). Accordingly, the address of the secondary table entry to be accessed is "index field value"+"Skey_field", that is, "a"+ "0b111111".

If the field information of the secondary table entry of the corresponding address is read out (step S707), it can be seen that the valid field is "0b1" (step S709) and the shift count field is "0" (steps 710 and 711). "A_I" stored in the information field is registered in the destination route information value (step S715) and the lookup algorithm is ended.

Accordingly, it can be seen that the destination route of the data packet having the destination address of "0b10110000_ 11111111_00111111_11111111" becomes "A_I".

Next, a case of the destination address 820 of the inputted data packet will be described below.

In case where the destination address is "0b10110000_ 11111111_00111110_11111111", if the destination address is mapped on the table lookup key field (step S702), the result is "Pkey_field=0b10110000_11111111_00", "Skey_field=0b111110" and "Tkey_field=0b11111111".

If the field information of the primary table entry is read out through "Pkey_field" (step S703), the valid field is "0b1" (step S704) and the shift count field is "6" (step S705). Accordingly, the address of the secondary table entry to be accessed is "index field value"+"Skey_field", that is, "a"+ "0b111110".

If the field information of the secondary table entry of the corresponding address is read out (step S707), it can be seen that the valid field is "0b1". (step S709) and'the shift count field is "8" (step S710). It means that the access must be performed to the entry field having the address value of "index field value"+"Tkey_field", that is, "b"+ "0b11111111".

If the field information of the third table entry of the corresponding address is read out (step S712), since the valid field is "0b1" (step S713), "B_I" stored in the information field is registered in the destination route information value (step S716) and the lookup algorithm is ended.

Accordingly, it can be seen that the destination route of the data packet having the destination address of "0b10110000_11111111_00111110_11111111" becomes "B_I".

Next, a case of the destination address 830 of the inputted data packet will be described below.

In case where the destination address is "0b11111111_11111111_10000000_00000000", if the destination address is mapped on the table lookup key field (step S702), the result is "Pkey_field=0b11111111_11111111_10", "Skey_field=0b000000" and "Tkey_field=0b00000000".

If the field information of the primary table entry is read out through "Pkey_field" (step S703), the valid field is "0b1" (step S704) and the shift count field is "0" (steps 705 and 706). Accordingly, the address of the secondary table entry to be accessed is "index field value", that is, "c".

If the field information of the secondary table entry of the corresponding address is read out (step S708), it can be seen that the valid field is "0b1" (step S709) and the shift count field is "0" (steps 710 and 711). "C_I" stored in the information field is registered in the destination route information value (step S715) and the lookup algorithm is ended.

Accordingly, it can be seen that the destination route of the data packet having the destination address of "0b11111111_11111111_10000000_00000000" becomes "C_I".

Last, a case of the destination address 840 of the inputted data packet will be described below.

In case where the destination address is "0b11111111_11111111_01000000_00000000", if the destination address is mapped on the table lookup key field (step S702), the result is "Pkey_field=0b11111111_11111111_01", "Skey_field=0b000000" and "Tkey_field=0b00000000".

If the field information of the primary table entry is read out through "Pkey_field" (step S703), the valid field is not "0b1" (step S704). Accordingly, a default route is inputted to the destination route information value (step S714) and the lookup algorithm is ended.

The routing lookup method in accordance with the present invention can be stored in a computer-readable recording media (CDROM, RAM, ROM, floppy disk, hard disk, magneto-optical disk, etc.).

As described above, the packets can be transmitted at a high speed by decreasing the number of accesses to the memory storing the lookup information in order to rapidly look up the destination information on data packets.

Further, the tables are built in blocks and the modification, creation and deletion of the lookup information are managed only in block unit, such that the previously created entries are not influenced. Therefore, it is possible to provide an efficient routing table entry management.

While the present invention has been described with respect to the particular embodiments, it will be apparent to those skilled in the art that various changes and modifications may be made without departing from the spirit and scope of the invention as defined in the following claims.

What is claimed is:

1. A packet forwarding processing apparatus of a high speed routing system, comprising:
   a routing table storage means for storing routing tables containing routing table entries, the routing table entries being built based on a collected routing information;
   a routing table management means for modifying, creating and deleting the routing table entries, wherein the routing table management means
   receives a control information on modification, creation and deletion of the routing table with respect to a prefix and a destination route information from a main processor for managing an overall routing information of the high speed routing system to thereby manage the routing table storage means, and
   uses a table lookup key to manage the modification, creation and deletion of the routing table entry according to the prefix value and to look up destination route of the routing table entry based on destination address in an incoming packet, wherein the table lookup key includes a prefix that is a routing information of the routing table management means; and
   a routing table lookup means for looking up destination route information from the routing tables, the destination route information being associated with destination address extracted from an input data packet.

2. The packet forwarding processing apparatus as recited in claim 1, wherein the routing information includes a prefix and a destination route.

3. The packet forwarding processing apparatus as recited in claim 1, wherein the routing table lookup means selects a most approximate entry among the entries stored in the routing table storage means using a longest prefix matching, based on a packet destination address of an incoming data packet, and extracts a packet destination route stored in the routing table storage means and performs a process of mapping the extracted packet destination route on the input data packet.

4. The packet forwarding processing apparatus as recited in claim 1, wherein the prefix is provided with a "Pkey_field" occupying "Pkey" bits, a "Skey_field" occupying "Skey" bits, and a "Tkey_field" occupying "Tkey" bits.

5. The packet forwarding processing apparatus as recited in claim 4, wherein the routing table storage means includes the prefix information, the packet destination route information mapped with the prefix information, and entries having fields of control bits, the routing table storage means being configured with a primary table, a secondary table and a third table.

6. The packet forwarding processing apparatus as recited in claim 5, wherein the primary table is built with $2^{Pkey}$ entries and the number of address bits for distinguishing each entry is identical to the "Pkey" bits, which is the first field of the table lookup key, the primary table including a valid field for indicating an utility of information stored in a corresponding entry, a shift count field for indicating a block size within the secondary table, and an index field for indexing within the routing table storage means.

7. The packet forwarding processing apparatus as recited in claim 5, wherein the secondary table is built with independent single entries and a plurality of blocks configured with $2^{Skey}$ entries having fixed values, the secondary table including a valid field for indicating an utility of information stored in a corresponding entry, a shift count field for indicating a block size within the third table, an information field for storing destination route information, and an index field for indexing within the third table.

8. The packet forwarding processing apparatus as recited in claim 5, wherein the third table is built in a plurality of blocks configured with $2^{Tkey}$ entries having fixed values, the third table including a valid field for indicating an utility of information stored in a corresponding entry and an information field for storing destination route information.

9. A routing lookup method of a high speed routing system, comprising the steps of:
   a) extracting destination address from an inputted data packet at a routing table lookup block;
   b) mapping the extracted destination address on a table lookup key;

c) reading out contents of each field through a memory access to a primary table entry having same address as "Pkey_field" value, which is a first field of the mapped table lookup key;

d) checking whether a valid field value of the read primary table entry is a predetermined value;

e) if the valid field value is not the predetermined value at the step d) inputting a default route to a destination route information value;

f) if the valid field value is the predetermined value, checking whether a shift count field value is a predetermined value;

g) if the shift count field value is not the predetermined value at the step f), checking whether the shift count field value is another predetermined value, and if not, inputting a default route to a destination route information value, and if the shift count field value is the predetermined value or the another predetermined value, reading out field contents of a secondary table entry through an access to the secondary table entry;

h) checking whether a valid field value of the read secondary table entry is a predetermined value;

i) if the valid field value is not the predetermined value at the step h), inputting a default route to a destination route information;

j) if the valid field value is a predetermined value, checking whether a shift count field value is a predetermined value;

k) if the shift count value is not the predetermined value at the step j), checking whether the shift count value is another predetermined value, and if not, inputting a default route to a destination route information value, and if the shift count field value is the predetermined value, inputting "information field value of a secondary table entry" to a destination route information, and if the shift count field value is the another predetermined value, reading out field contents of a third table entry through an access to the third table entry; and l) if a valid field value of the read third table entry field is a predetermined value, inputting "information field value of a third table entry" to a destination route information, and if the valid field value of the read third table entry field is not the predetermined value, inputting a default route to a destination route information.

10. The routing lookup method as recited in claim 9, wherein in case where a destination address in IP network is IPv4, the destination address is 32-bit destination IP address, and the extracted 32-bit destination address is mapped on the table lookup key.

11. The routing lookup method as recited in claim 9, wherein, at the step g), if the shift count field is the predetermined value, field contents of the entry having a memory address of "primary table entry index field value+Skey_field value" are read out through a memory access, and if the shift count field is the another predetermined value, field contents of the entry having a memory address of "primary table entry index field value" are read out through a memory access.

12. The routing lookup method as recited in claim 9, wherein, at the step k), memory address of the third table enry is "secondary table entry index field value+Tkey_field".

* * * * *